US011158856B2

(12) United States Patent
Mane et al.

(10) Patent No.: US 11,158,856 B2
(45) Date of Patent: Oct. 26, 2021

(54) COMPOSITE BILAYER COATINGS FOR HIGH CAPACITY CATHODES AND ANODES

(71) Applicant: UCHICAGO ARGONNE, LLC, Chicago, IL (US)

(72) Inventors: Anil U. Mane, Naperville, IL (US); Jason R. Croy, Plainfield, IL (US); Jeffrey W. Elam, Elmhurst, IL (US); Mahalingam Balasubramanian, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 97 days.

(21) Appl. No.: 15/968,314

(22) Filed: May 1, 2018

(65) Prior Publication Data
US 2019/0341618 A1 Nov. 7, 2019

(51) Int. Cl.
*H01M 4/62* (2006.01)
*H01M 4/36* (2006.01)
*H01M 4/485* (2010.01)
*H01M 4/1391* (2010.01)
*H01M 4/04* (2006.01)
*H01M 10/0525* (2010.01)
*H01M 4/02* (2006.01)
*H01M 4/58* (2010.01)
*H01M 4/48* (2010.01)
*H01M 4/131* (2010.01)
*H01M 4/525* (2010.01)
*H01M 4/505* (2010.01)
*H01M 10/42* (2006.01)

(52) U.S. Cl.
CPC ......... *H01M 4/628* (2013.01); *H01M 4/0428* (2013.01); *H01M 4/1391* (2013.01); *H01M 4/366* (2013.01); *H01M 4/485* (2013.01); *H01M 10/0525* (2013.01); *H01M 4/131* (2013.01); *H01M 4/483* (2013.01); *H01M 4/505* (2013.01); *H01M 4/525* (2013.01); *H01M 4/582* (2013.01); *H01M 4/5815* (2013.01); *H01M 10/4235* (2013.01); *H01M 2004/028* (2013.01); *Y02E 60/10* (2013.01)

(58) Field of Classification Search
CPC .............. H01M 4/0428; H01M 4/628; H01M 2004/028; H01M 10/0525; H01M 4/366; H01M 4/1391; H01M 4/485
USPC ...................................... 429/231.6
See application file for complete search history.

(56) References Cited

U.S. PATENT DOCUMENTS 8,921,799 B2    12/2014  Elam et al.
2007/0015048 A1  1/2007  Lee et al.
(Continued)

OTHER PUBLICATIONS

U.S. Office Action on U.S. Appl. No. 14/693,719 dated Jan. 12, 2018.
(Continued)

*Primary Examiner* — Jonathan G Jelsma
*Assistant Examiner* — Omar M Kekia
(74) *Attorney, Agent, or Firm* — Foley & Lardner LLP

(57) ABSTRACT

An electrode comprises an electrode core. A composite bilayer coating is conformally disposed on the electrode core. The composite bilayer coating comprises a first layer disposed on at least a portion of the electrode core. The first layer comprises a metal fluoride, a metal oxide or a metal sulfide. A second layer is disposed on the first layer and comprises a metal fluoride, a metal oxide or a metal sulfide.

11 Claims, 4 Drawing Sheets

(56) References Cited

U.S. PATENT DOCUMENTS

| | | | |
|---|---|---|---|
| 2009/0087362 A1 | 4/2009 | Sun et al. | |
| 2009/0155590 A1 | 6/2009 | Kelder et al. | |
| 2012/0187305 A1 | 7/2012 | Elam et al. | |
| 2012/0196186 A1* | 8/2012 | Richard | H01M 4/366 429/231.6 |
| 2013/0335190 A1 | 12/2013 | Elam et al. | |
| 2014/0113197 A1 | 4/2014 | Xiao et al. | |
| 2014/0302392 A1 | 10/2014 | Li et al. | |
| 2015/0180023 A1* | 6/2015 | Xiao | H01M 4/366 429/231 |
| 2015/0364747 A1* | 12/2015 | Elam | H01M 4/5815 204/192.1 |
| 2016/0260962 A1 | 9/2016 | Mane et al. | |

OTHER PUBLICATIONS

U.S. Office Action on U.S. Appl. No. 14/693,719 dated May 4, 2017.

U.S. Office Action on U.S. Appl. No. 14/693,719 dated Sep. 18, 2017.

Appapillai, et al., "Microstructure of LiCoO2 with and without "AlPO4" Nanoparticle Coating: Combined STEM and XPS Studies," Chemistry of Materials 19(23), pp. 5748-5757 (2007).

Burton, et al., "Atomic Layer Deposition of MgO Using Bis(ethylcyclopentadienyl)magnesium and H2O," The Journal of Physical Chemistry C 113(5), pp. 1939-1946 (2009).

Chen & Dahn, "Improving the Capacity Retention of LiCoO2 Cycled to 4.5 V by Heat-Treatment," Electrochemical and Solid-State Letters 7(1), pp. A11-A14 (2004).

Chen & Dahn, "Studies of LiCoO2 Coated with Metal Oxides," Electrochemical and Solid-State Letters 6(11), pp. A221-A224 (2003).

Chen, et al., "Advanced cathode materials for lithium-ion batteries," MRS Bulletin 36(7), pp. 498-505 (2011).

Chen, et al., "Atomic layer-deposited tunnel oxide stabilizes silicon photoanodes for water oxidation," Nature Materials 10, pp. 539-544 (2011).

Chen, et al., "Role of surface coating on cathode materials for lithium-ion batteries," Journal of Materials Chemistry 20, pp. 7606-7612 (2010).

Cho, et al., "Zero-Strain Intercalation Cathode for Rechargeable Li-Ion Cell," Angewandte Chemie International Edition 40(18), pp. 3367-3369 (2001).

Comstock & Elam, "Mechanistic Study of Lithium Aluminum Oxide Atomic Layer Deposition," The Journal of Physical Chemistry C 117(4), pp. 1677-1683 (2013).

Elam, et al., "Synthesis, Characterization, and Application of Tunable Resistance Coatings Prepared by Atomic Layer Deposition," ECS Transactions 58(10), pp. 249-2261 (2013).

George, "Atomic Layer Deposition: An Overview," Chemical Reviews 110(1), pp. 111-131 (2010).

Jung, et al., "Enhanced Stability of LiCoO2 Cathodes in Lithium-Ion Batteries Using Surface Modification by Atomic Layer Deposition," Journal of The Electrochemical Society 157(1), pp. A75-A81 (2010).

Jung, et al., "Ultrathin Direct Atomic Layer Deposition on Composite Electrodes for Highly Durable and Safe Li-Ion Batteries," Advanced Materials 22(19), pp. 2172-2176 (2010).

Klug, et al., "Atomic Layer Deposition of Amorphous Niobium Carbide-Based Thin Film Superconductors," The Journal of Physical Chemistry C 115(50), pp. 25063-25071 (2011).

Lee, et al., "Roles of Surface Chemistry on Safety and Electrochemistry in Lithium Ion Batteries," Accounts of Chemical Research 46(5), pp. 1161-1170 (2013).

Li, et al., "Atomic layer deposition of solid-state electrolyte coated cathode materials with superior high-voltage cycling behavior for lithium ion battery application," Energy & Environmental Science 7, pp. 768-778 (2014).

Li, et al., "Cathode materials modified by surface coating for lithium ion batteries," Electrochimica Acta 51(19), pp. 3872-3883 (2006).

Liu, et al., "Atomic Layer Deposition of Lithium Tantalate Solid-State Electrolytes," The Journal of Physical Chemistry C 117(39), pp. 20260-20267 (2013).

Long, et al., "Advances in Stabilizing 'Layered-Layered' xLi2MnO3 (1-x)LiMO2 (M=Mn, Ni, Co) Electrodes with a Spinel Component," Journal of The Electrochemical Society 161(14), pp. A2160-A2167 (2014).

Long, et al., "Enabling High-Energy, High-Voltage Lithium-Ion Cells: Standardization of Coin-Cell Assembly, Electrochemical Testing, and Evaluation of Full Cells," Journal of The Electrochemical Society 163(14), pp. A2999-A3009 (2016).

Mane & Elam, "Atomic Layer Deposition of W:Al2O3 Nanocomposite Films with Tunable Resistivity," Chemical Vapor Deposition 19(4-6), pp. 186-193 (2013).

Mane, et al., "Unusual Atomic Layer Deposition of Bi-Metallic Fluorides and Oxyfluorides," ALD 2014 Conference, 17 pages (2014).

Mantymaki, et al., "Atomic Layer Deposition of LiF Thin Films from Lithd, Mg(thd)2, and TiF4 Precursors," Chemistry of Materials 25(9), pp. 1656-1663 (2013).

Park, et al., "Amorphous Metal Fluoride Passivation Coatings Prepared by Atomic Layer Deposition on LiCoO2 for Li-Ion Batteries," Chemistry of Materials 27(6), pp. 1917-1920 (2015).

Park, et al., "Ultrathin Lithium-Ion Conducting Coatings for Increased Interfacial Stability in High Voltage Lithium-Ion Batteries," Chemistry of Materials 26(10), pp. 3128-3134 (2014).

Pilvi, et al., "Atomic layer deposition process with TiF4 as a precursor for depositing metal fluoride thin films," Applied Optics 47(13), pp. C271-C274 (2008).

Plivi, et al., "Atomic Layer Deposition of MgF2 Thin Films Using TaF5 as a Novel Fluorine Source," Chemistry of Materials 20(15), pp. 5023-5028 (2008).

Sun, et al., "AlF3-Coating to Improve High Voltage Cycling Performance of Li[Ni1/3Co1/3Mn1/3]O2 Cathode Materials for Lithium Secondary Batteries," Journal of the Electrochemical Society 154(3), pp. A168-A172 (2007).

Sun, et al., "Significant improvement of high voltage cycling behavior AlF3-coated LiCoO2 cathode," Electrochemistry Communications 8(5), pp. 821-826 (2006).

Sun, et al., "The Role of AlF3 Coatings in Improving Electrochemical Cycling of Li-Enriched Nickel-Manganese Oxide Electrodes for Li-Ion Batteries," Advanced Materials 24(9), pp. 1192-1196 (2012).

Tarascon & Armand, "Issues and challenges facing rechargeable lithium batteries," Nature 414, pp. 359-367 (2001).

Thackeray, et al., "Electrical energy storage for transportation—approaching the limits of, and going beyond, lithium-ion batteries," Energy & Environmental Science 5, pp. 7854-7863 (2012).

Tressaud, et al., "Switchable hydrophobic-hydrophilic layer obtained onto porous alumina by plasma-enhanced fluorination," Science in China Series E: Technological Sciences 54(1), pp. 104-110 (2009).

Wang, et al., "TEM Study of Electrochemical Cycling-Induced Damage and Disorder in LiCoO2 Cathodes for Rechargeable Lithium Batteries," Journal of the Electrochemical Society 146(2), pp. 473-480 (1999).

Yang & Tarascon, "Towards systems materials engineering," Nature Materials 11, pp. 560-563 (2012).

Ylilammi & Ranta-Aho, "Metal Fluoride Thin Films Prepared by Atomic Layer Deposition," Journal of the Electrochemical Society 141(5), pp. 1278-1284 (1994).

Zhang, et al., "Structural and Electrochemical Study of Al2O3 and TiO2 Coated Li1.2Ni0.13Mn0.54Co0.13O2 Cathode Material Using ALD," Advanced Energy Materials 3(10), pp. 1299-1307 (2013).

* cited by examiner

COMPOSITE BILAYER COATINGS FOR HIGH CAPACITY CATHODES AND ANODES The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to the field of coatings for electrochemical cell electrodes.

BACKGROUND

Advanced electrodes for use in electrochemical cells (e.g., batteries) such as Li-ion cathodes (e.g., lithium and manganese rich, layered-layered spinel (LLS), $LiCoO_2$ or $LiNiMnCoO$ (NMC) cathodes) can deliver high energies and capacities. Such electrodes are highly desirable for emerging energy applications, particularly for high-voltage operations (e.g., ≥approximately 4.4 V vs Li/Li+). However, for such cathode materials to be reliably used in high voltage applications and operate successfully in practical electrochemical cells, stabilization of both cathode/electrolyte and anode/electrolyte interfaces is desirable. This is particularly true for electrochemical systems that have a propensity for cathode-surface, oxygen activity and transition metal dissolution and migration to anode surfaces.

SUMMARY

Embodiments described herein relate generally to electrodes for use in electrochemical devices that include a composite bilayer coating disposed on a surface thereof, and in particular, to electrodes that include any combination of a metal oxide, metal fluoride or metal sulfide composite bilayer coating disposed thereon.

In some embodiments, an electrode comprises an electrode core. A composite bilayer coating is conformally disposed on at least a portion of the electrode core. The composite bilayer coating comprises a first layer disposed on at least the portion of the electrode core. The first layer comprises a metal fluoride, a metal oxide or a metal sulfide. A second layer is disposed on the first layer and comprises a metal fluoride, a metal oxide or a metal sulfide.

In some embodiments, an electrochemical cell comprises a cathode comprising a cathode core, and a cathode composite bilayer coating conformally disposed on at least a portion of the cathode core. The cathode composite bilayer coating comprises a cathode first layer disposed on at least the portion of the cathode core, the cathode first layer comprising a metal fluoride, a metal oxide or a metal sulfide. A cathode second layer is disposed on the cathode first layer, the cathode second layer comprising a metal fluoride, a metal oxide or a metal sulfide. The electrochemical cell also comprises an anode, and a separator disposed between the cathode and the anode.

In some embodiments, a method comprises providing an electrode comprising an electrode core. The method further comprises performing A ALD cycles of a first precursor material comprising a metal precursor at a first deposition temperature on the electrode; performing B ALD cycles of a second precursor material comprising one of a fluoride, an oxide or a sulfide precursor at a second deposition temperature on the electrode; performing C ALD cycles of a third precursor material comprising a metal precursor at a third deposition temperature on the electrode; and performing D ALD cycles of a fourth precursor material comprising one of a fluoride, an oxide or a sulfide precursor at a fourth deposition temperature on the electrode. The respective ALD cycles form a conformal bilayer coating on at least a portion of the electrode core. The composite bilayer coating comprises a first layer disposed on at least the portion of the electrode core, the first layer comprising a metal fluoride, a metal oxide or a metal sulfide, and a second layer disposed on the first layer, the second layer comprising a metal fluoride, a metal oxide or a metal sulfide.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
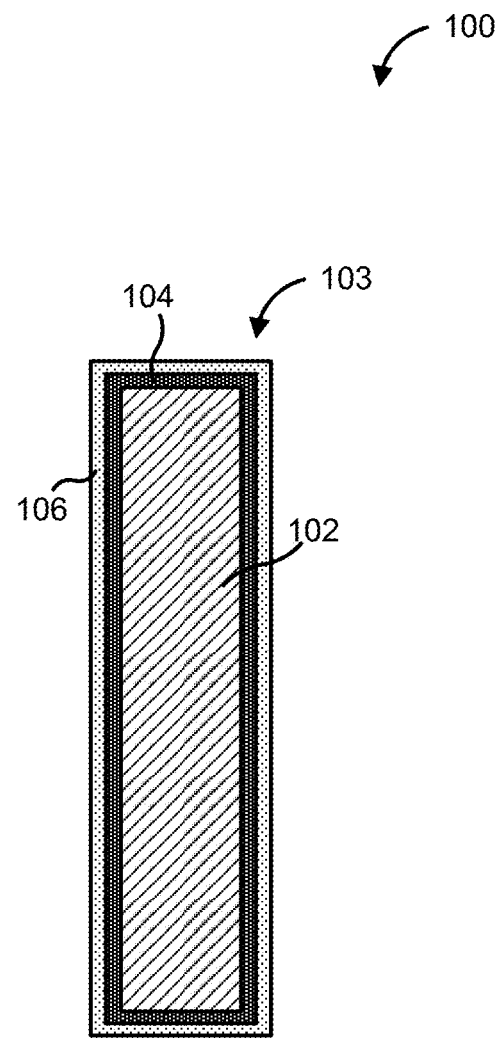
FIG. 1 is cross-section view of an electrode, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF THE VARIOUS EMBODIMENTS

Embodiments described herein relate generally to electrodes for use in electrochemical devices that include a composite bilayer coating disposed on a surface thereof, and in particular, to electrodes that include any combination of a metal oxide, metal fluoride or metal sulfide composite bilayer coating disposed thereon.

The fabrication of robust interfaces between electrodes and electrolytes that satisfy the application-dependent, electrochemical demands of various systems is one of the great challenges of interfacial science. In particular, irreversible reactions between non-aqueous electrolytes and metal oxides are often considered to be a rate-limiting step adversely affecting the overall performance of lithium-ion (Li-ion) batteries. Li-Ion batteries, in general, suffer irreversible capacity losses during high voltage operation due, in part, to corrosion of active materials in the acidic electrolyte as well as electrolyte decomposition. Small levels of moisture (e.g., in a range of 20-100 ppm) present in battery-grade electrolytes can react with lithium salts (e.g. $LiPF_6$) to generate hydrofluoric acid (HF). HF subsequently attacks the surfaces of electrode materials causing transition metal dissolution and migration to the negative electrode. Furthermore, surface layers (e.g., solid electrolyte interface (SEI) layer) can form as a result of electrolyte oxidation at high voltages which impede Li-ion diffusion. Other issues which might degrade performance of electrochemical cells may include metal diffusion into electrolytes and formation of cathode/electrolyte interfaces.

Coating electrode surfaces with metal oxides such as $Al_2O_3$, MgO, ZnO, and $TiO_2$ has proven to be effective in mitigating irreversible side reactions. These metal oxides coatings, however, are also susceptible to HF attack and may not be stable over long-term cycling, converting partially to metal fluorides when scavenging HF as reported earlier. Furthermore, byproducts of these reactions generate additional water in the electrolyte again making electrode/electrolyte interfaces unstable.

The high electronegativity of fluorine results in strongly bonded cations relative to oxygen and should be beneficial in limiting unwanted surface reactions. In particular, $AlF_3$-coated positive electrodes ($LiCoO_2$, $LiNi_{1/3}Mn_{1/3}CO_{1/3}O_2$, $[Li_{0.19}Mn_{0.57}Ni_{0.16}Co_{0.08}]O_2$, etc.) have demonstrated significant improvements in cycling stability and safety when $AlF_3$ is applied via solution-based routes. The $AlF_3$ layers provide some resistivity to HF attack, but are insulating resulting in decreased cathode performance. Including Tungsten (W) in the $ALF_3$ or any other metal fluoride layer may increase the conductivity and reduce impedance. However, contact with the electrolyte may lead to dissolution of W. Furthermore, wet-chemical processes, as well as standard physical vapor deposition (PVD), have limitations in forming coatings. Non-uniform thicknesses and/or compositional variation of coating layers can arise from the directional nature of deposition (PVD) or by the secondary heating steps required for solution-based routes. As thickness can alter the impact the layer has on the underlying cathode performance, the ability to finely tune and control thickness is important.

Various embodiments of the composite bilayer coated electrodes and electrochemical cells formed therefrom may provide benefits including, for example: (1) stabilizing the cathodes and electrodes, particularly electrode/electrolyte interfaces; (2) preventing cathode surface oxygen activity and transition metal dissolution; (3) mitigation of reactions and active lithium loss at anode surfaces; (4) low temperature deposition (e.g., at less than 200 degrees Celsius) allowing implementation of the composite bilayer coatings on battery electrode assemblies; (5) providing high control over growth, composition and interface; (6) providing scalability for high volume processing and deposition on large electrodes; (7) allowing synthesis of graded or variable thickness composite bilayer coatings; (8) avoiding any change in electrode impedance; (9) preventing transition metal (e.g., W) dissolution; (10) protecting from HF attacks; (11) enabling maintaining of up to 90% of initial capacity of cathodes; and (12) allowing implementation with a variety of cathode and anode chemistries.

FIG. 1 is cross-sectional view of an electrode 100, according to an embodiment. The electrode 100 includes an electrode core 102. In some embodiments, the electrode 100 may include a cathode. In such embodiments, the electrode core 102 may include one of a lithium-magnesium rich layered-layered spinel (LLS), a $LiCoO_2$, a $LiN_{1/3}Mn_{1/3}CO_{1/3}O_2$ (NMC) or a $Li[Li_{0.19}Mn_{0.57}Ni_{0.16}CO_{0.08}]O_2$ or any other suitable cathode. In other embodiments, the electrode 100 may include an anode. In such embodiments, the electrode core 102 may include graphite and or any other carbonaceous material such as, for example, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In other embodiments, the anode may include a lithium anode. In still other embodiments, the anode may include a silicon or silicon-carbon composite anode. The electrode core 102 may include a formed electrode (e.g., casted or coated to form a solid electrode) or a powder comprising one or more materials included in the electrode core 102 formulation.

The electrode 100 may be configured for use in a high voltage operation (e.g., ≥approximately 4.4 V vs Li/Li+). As described before, operation at such high voltages for existing electrodes may lead to unfavorable reactions at the electrode/electrolyte interface (e.g., oxygen reactions) or corrosion and dissolution because of exposure to acidic species (e.g., HF) produced in the electrolyte. In contrast, the electrode 100 includes a composite bilayer coating 103 conformally disposed on at least a portion of a surface of the electrode core 102. The composite bilayer coating 103 protects the surface of the electrode from, for example, oxidation reaction and acidic species (e.g., generated by degradation of the electrolyte) without any significant impact or degradation of an initial charge capacity of the electrode 100. As described herein, the term "conformally" implies that the composite bilayer coating has a uniform thickness over the entire surface of the electrode core 102 and conforms to the contours of at least the portion of the electrode core 102.

In various embodiments, the composite bilayer coating 103 includes a first layer 104 disposed on at least the portion of the electrode core 102. The first layer 104 includes at least one of a metal fluoride, a metal oxide or a metal sulfide. Furthermore, the composite bilayer coating 103 includes a second layer 106 disposed on the first layer 104. The second layer 106 may also comprise at least one of metal fluoride, a metal oxide or a metal sulfide. For example, the first layer 104 may include a metal fluoride and the second layer 106 may include any one of a metal fluoride, a metal oxide or a metal sulfide. In other embodiments, the first layer 104 may comprise a metal oxide and the second layer 106 may include any one of a metal fluoride, a metal oxide or a metal sulfide. In still other embodiments, the first layer 104 may comprise a metal sulfide and the second layer 106 may include any one of a metal fluoride, a metal oxide or a metal sulfide. While shown as including the first layer 104 and the second layer 106, in various embodiments, the composite bilayer coating 102 may include an even higher number of layers having any combination of the various materials described herein (e.g., three layers in a composite trilayer coating, four layers in a composite quatrolayer coating, and so on).

In a specific embodiment, the electrode core 102 includes a Li—Mn rich LLS. Furthermore, the composite bilayer 103 includes a first layer 104 comprising $Al_xF_yW_z$ or $Al_xF_yW_zC_a$ where x, y, z and a are greater than 0. A thickness of the first layer 104 may be equal to or less than 1 nm (e.g., 0.1, 0.2, 0.3, 0.4, 0.5, 0.6, 0.7, 0.8, 0.9 or 1 nm inclusive of all ranges and values therebetween). This thickness may allow diffusion of lithium while protecting the electrode core 102. The tungsten included in the first layer 104 may lower the impedance of the first layer 102 but is also susceptible to dissolution, for example, due to exposure to HF or other acidic species that may be included in the electrolyte or generated in the electrolyte due to electrolyte degradation. However, the second layer 106 of the composite bilayer 103 is configured to protect the tungsten in the first layer from dissolution. In some embodiments, the second layer 106 may include $AlF_3$ having a thickness of less than 1 nm. In other embodiments, the second layer 106 may include a metal oxide (e.g., $Al_2O_3$ or any other metal oxide described herein) or a metal sulfide (e.g., LiS or any other metal sulfide described herein). In some embodiments, the total thickness of the composite bilayer coating 103 is equal to or less than 1 nm. In some embodiments, the first layer 104 may be thicker than the second layer 106. In other embodiments, the second layer 106 may be thicker than the first layer 104.

In some embodiments, the metal fluoride comprises at least one of $Mg_xF_y$, $Al_xF_y$, $Li_xF_y$, $Al_xF_yW_z$ or $Al_xF_yW_zC_a$, where x, y, z and a are greater than 0. In some embodiments, the metal oxide comprises at least one of $Al_xO_y$, $Mg_xO_y$, or $Zr_xO_y$, where x and y are greater than 0. In some embodiments, the metal oxide comprises any one of $HfO_2$, $TiO_2$, $Y_2O_3$, or $ZrO_2$. In particular embodiments, the metal oxide may also be an oxide of the Lanthanide series or of the rare earth elements. In other embodiments, the metal oxide includes one or more Perovskites, including $CaTiO_3$, $BaTiO_3$, $SrTiO_3$, $PbTiO_3$, lead zirconate titanate (PZT), lead lanthanum zirconate titanate (PLZT), lead magnesium niobate (PMN), $KNbO_3$, $K_xNa_{1-x}NbO_3$, or $K(Ta_xNb_{1-x})O_3$. In other embodiments, the metal sulfide comprises at least one of $Li_xS_y$ or $Mo_xS_y$, where x and y are greater than 0. Some examples of composite bilayer coating 103 may include but are not limited to a metal fluoride-metal fluoride composite bilayer coating (e.g., $MgF_2$-$AlF_3$, LiF—$MgF_2$, $AlF_3$—LiF, etc.), a metal oxide-metal fluoride coating (e.g., $Al_2O_3$—$MgF_2$, $MgO_2$—LiF, etc.), a metal oxide-metal oxide coating (e.g., $Al_2O_3$—MgO, $ZrO_2$—MgO, etc.), a metal sulfide-metal fluoride coating (e.g. LiS—LiF, $MoS_2$—$AlF_3$, LiS—$MgF_2$, etc.), and a metal sulfide-metal oxide coating (e.g. $MoS_2$—$Al_2O_3$, LiS—MgO, $MoS_2$—MgO, etc.)

In some embodiments, the composite bilayer coating 103 may be deposited on the electrode core 103 once the electrode core 103 has been formed into an electrode (e.g., deposited, on a current collector, casted or molded into the electrode form, etc.) In other embodiments, the composite bilayer coating 103 may be deposited or powders used in formulating the electrode core 102 (e.g., any of the materials for electrode core 102 described herein). This may be followed by secondary treatments (e.g., annealing) so as to facilitate mixing between the composite bilayer coating 103 materials (e.g., the first layer 104 and the second layer 106), and between the layers and the electrode 100 materials (e.g., between the first and/or second layers 104 and 106, and the electrode core 102 materials). This provides an opportunity to create unique, integrated materials, graded from within the surface of the electrode core 102 to the surface of the composite bilayer coating 103. This has implications for tuning properties of both electrode/coating interfaces as well as coating/electrolyte (solid and liquid) interfaces. Furthermore, post-treatment steps, for example, annealing time, temperature, atmosphere composition, atmospheric pressure, etc. may be adjusted for increasing mixing of the composite bilayer coating 103 materials and the electrode core 102 materials. This may allow for the synthesis of unique surface films and interfacial modifications, beyond initial deposition of materials, leading to an extra degree of control in tuning interfacial (e.g., electrode/layer and layer/electrolyte interfaces) properties such as stability, lithium transport, impedance.

In various embodiments, the composite bilayer coating 103 may have a thickness of less than 1 nm. Such a small thickness may allow the composite bilayer coating 103 to stabilize the electrode core 102 without having any significant impact on the impedance of the electrode 100. In various embodiments, the thin composite bilayer coating 103 may be deposited using an ALD process which may allow controlled deposition of the thin conformal bilayer coating 103 on the electrode core 102.

Expanding further, ALD is a modified form of chemical vapor deposition (CVD) that uses the self-limiting nature of specific precursors to deposit films in a layer-by-layer fashion. ALD is particularly well-suited for coating electrode surfaces in that a conformal (i.e., uniform in thickness and conforming to the contours of the electrode core 102) coating can be applied with precise control of thickness and composition. Conventional ALD-coated electrodes have primarily focused on metal oxides such as $Al_2O_3$, $TiO_2$, $LiAlO_2$, and $LiTaO_3$ because the ALD chemistry of these oxides is well known. Metal fluoride growth by ALD is complex and challenging, mainly due to the lack of suitable fluorine precursors. For example, HF, a highly aggressive chemical etching agent, has been used to deposit $CaF_2$, $ZnF_2$, and $SrF_2$. More recently, alternative ALD chemistries have been developed such as $MgF_2$ and LiF ALD using either $TaF_5$ or $TiF_4$ as the fluorine precursor for optical applications. However, the substrate temperatures in these cases were 300-400 degrees Celsius, high enough to degrade battery electrode laminates containing polymeric binders. Another potential limitation of $AlF_3$ for Li-ion batteries is that it is a wide-bandgap dielectric and hence electrically insulating. Although still promising as a coating, methods to enhance the material's conductivity while maintaining its superb resistance to chemical attack could be advantageous.

U.S. Pat. No. 8,921,799 and pending application published as U.S. Pat. App. Pub. No. 2012/0187305, which are incorporated herein by reference in their entirety, describe a general method and materials from the method relating ALD of a composite coating. One composite coating that is of particular benefit includes an ultrathin, amorphous, composite aluminum-tungsten-fluoride ($AlW_xF_y$) films deposited using a ALD cycles of trimethyaluminum (TMA) and tungsten hexafluoride ($WF_6$), at a temperature range between 50 and 300 degrees Celsius on an electrode, such as a $LiCoO_2$ electrode. Such films are created with metal fluoride and do not utilize a metal oxide. There is no oxidant step involved in TMA-$WF_6$ process; TMA reduces tungsten terminated surface in various embodiments, $AlW_xF_yC_z$ is formed where x and y are any non-zero positive number and wherein z can be zero (no carbide), or any positive number.

These films are highly conducting, but incorporate $AlF_3$ in the composite. Although $LiCoO_2$ is the most commercially successful cathode material for Li-ion batteries, the practical use of $LiCoO_2$ is limited, in part, to surface reactions involving cobalt dissolution, electrolyte oxidation, as well as structural transformations occurring at potentials higher than ~4.3 V (vs. Li/Li+). U.S. patent application Ser. No. 14/693,719, filed Sep. 8, 2016 and entitled "Metal Fluoride Passivation Coatings Prepared by Atomic Layer Deposition on $LiCoO_2$ for Li-Ion Batteries," incorporated herein by reference in its entirety, describes ultrathin $AlW_xF_y$ and $AlW_xF_yC_z$ coatings (approximately 1 nm) on $LiCoO_2$ which are shown to significantly increase stability relative to bare $LiCoO_2$ when cycled up to 4.4 V.

In some embodiments, however, the tungsten included in such ALD films which increases conductivity and reduces impedance of the ALD film may slowly dissolve or corrode, particularly when used with LLS electrodes or NMC electrodes. In contrast, the composite bilayer coating 103 described herein protect dissolution of tungsten or any other transition metal included in the composite bilayer coating 103, and even allows metal oxides to be used as a component in the first layer 104 and/or the second layer 106 of the composite bi-layer coating. In various embodiments, each of the first layer 104 and the second layer 106 may be deposited on the electrode core 102 using one or more deposition cycles of suitable precursors, at a temperature of less than 200 degrees Celsius. For example, a metal precursor may include trimethylaluminum (TMA), triisobutylaluminum, aluminum tris(2,2,6,6-tetramethyl-3,5-heptanedionate), tris(dimethylamido)aluminum(III), diethyl zinc, diphenyl zinc, bis(pentafluorophenyl)zinc, bis(2,2,6,6-tetramethyl-3,5-heptanedionato)zinc(II), tetramethyl tin, molybdenumhexacarbonyl, Bis(cyclopentadienyl)magnesium(II), bis(cyclopentadienyl)zirconium(IV) dihydride 95%, zirconium(IV) dibutoxide(bis-2,4-pentanedionate), zirconium(IV) 2-ethylhexanoate or any other suitable metal precursor.

In various embodiments, an oxide precursor formulated to react with the metal precursor so as to grow a metal oxide layer (e.g., the first layer 104 and/or the second layer 106) on the electrode core 102 may include water. In some embodiments, a fluoride precursor formulated to react with the metal precursor so as to grow a metal fluoride layer (e.g., the first layer 104 and/or the second layer 106) on the electrode core 102 may include tungsten hexafluoride ($WF_6$), disilane ($Si_2H_6$) or sulfur hexafluoride. Similarly, in some embodiments, a sulfide precursor formulated to react with the metal precursor so as to grow a metal sulfide layer (e.g., the first layer 104 and/or the second layer 106) on the electrode core 102 may include hydrogen sulfide ($H_2S$). In still other embodiments, the fluoride or sulfide precursor may react with a metal (e.g., Li) included in the electrode core 102 (e.g., a Li cathode) so as to grow a metal fluoride (e.g., LiF) or metal sulfide (LiS) layer on the electrode core 102.

It should be understood that while described with respect to an ALD process, in other embodiments, any one of the first layer 104 and/or the second layer 106 may be deposited using any other method, for example, vapor deposition methods (e.g., CVD, MOCVD, OMCVD, PECVD), pulsed vapor deposition (PVD) methods (e.g., molecular beam epitaxy (MBE)), reactive sputtering, pulsed laser deposition, evaporation or wet chemical methods.

Figure 2:
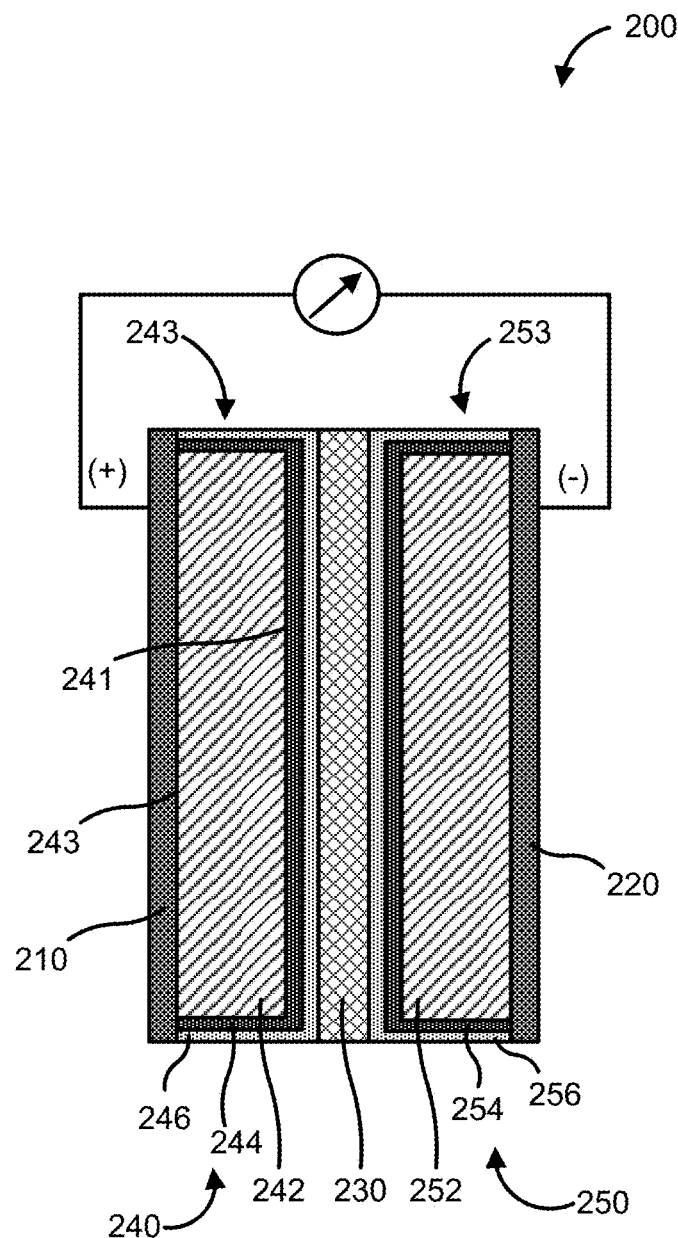
FIG. 2 is a schematic illustration of an electrochemical cell, according to an embodiment.

FIG. 2 is a schematic illustration of an electrochemical cell 200 according to an embodiment. The electrochemical cell 200 includes a positive current collector 210, a negative current collector 220, a cathode 240 disposed on the positive current collector 210, an anode disposed on the negative current collector 220 and a separator 230 disposed between the cathode 240 and the anode 250. The electrochemical cell 200 may include any pouch cell, a coin cell or a prismatic cell and may include layered or calendared cathode 240 and anode 250.

The cathode 240 and/or anode 250 can be disposed on the positive current collector 210 and the negative current collector 220, respectively using any suitable method, for example, coated, casted, drop coated, pressed, roll pressed, or deposited. The positive current collector 210 and the negative current collector 220 can be any current collectors that are electronically conductive and are electrochemically inactive under the operation conditions of the cell. Typical current collectors for lithium cells include copper, aluminum, or titanium for the negative current collector and aluminum for the positive current collector, in the form of sheets or mesh, or any combination thereof. Current collector materials can be selected to be stable at the operating potentials of the cathode 240 and the anode 250 of the electrochemical cell 200. For example, in non-aqueous lithium systems, the positive current collector 210 can include aluminum, or aluminum coated with conductive material that does not electrochemically dissolve at operating potentials of approximately 4.4 V with respect to Li/Li+. Such materials include platinum, gold, nickel, conductive metal oxides such as vanadium oxide, and carbon. The negative current collector 220 can include copper or other metals that do not form alloys or intermetallic compounds with lithium, carbon, and/or coatings comprising such materials disposed on another conductor.

The separator 230 is disposed between the cathode 240 and the anode 250 and can be any conventional membrane that is capable of ion transport. In some embodiments, the separator 230 is a liquid impermeable membrane that permits the transport of ions therethrough, namely a solid or gel ionic conductor. In some embodiments the separator 230 is a porous polymer membrane infused with a liquid electrolyte that allows for the shuttling of ions between the cathode 240 and anode 250 electroactive materials, while preventing the transfer of electrons. In some embodiments, the separator 230 may include a microporous membrane that prevents particles forming the positive and negative electrode compositions from crossing the membrane. In some embodiments, the separator 230 is a single or multilayer microporous separator, optionally with the ability to fuse or "shut down" above a certain temperature so that it no longer transmits working ions, of the type used in the lithium ion battery industry and well-known to those skilled in the art. In some embodiments, the separator 230 material can include polyethyleneoxide (PEO) polymer in which a lithium salt is complexed to provide lithium conductivity, or Nafion membranes which are proton conductors. For example, PEO based electrolytes can be used as the membrane, which is pinhole-free and a solid ionic conductor, optionally stabilized with other membranes such as glass fiber separators as supporting layers. PEO can also be used as a slurry stabilizer, dispersant, etc. in the positive or negative redox compositions. PEO is stable in contact with typical alkyl carbonate-based electrolytes. This can be especially useful in phosphate-based cell chemistries with cell potential at the positive electrode that is less than about 3.6 V with respect to Li metal. The operating temperature of the redox cell can be elevated as necessary to improve the ionic conductivity of the membrane.

In some embodiments, the cathode 240 and/or anode 250 can be infused with a non-aqueous liquid electrolyte that can include polar solvents such as, for example, alcohols or aprotic organic solvents. Numerous organic solvents have been proposed as the components of Li-ion battery electrolytes, notably a family of cyclic carbonate esters such as ethylene carbonate, propylene carbonate, butylene carbonate, and their chlorinated or fluorinated derivatives, and a family of acyclic dialkyl carbonate esters, such as dimethyl carbonate, diethyl carbonate, ethylmethyl carbonate, dipropyl carbonate, methyl propyl carbonate, ethyl propyl carbonate, dibutyl carbonate, butylmethyl carbonate, butylethyl carbonate and butylpropyl carbonate. Other solvents proposed as components of Li-ion battery electrolyte solutions include y-butyrolactone, dimethoxyethane, tetrahydrofuran, 2-methyl tetrahydrofuran, 1,3-dioxolane, 4-methyl-1,3-dioxolane, diethyl ether, sulfolane, methylsulfolane, acetonitrile, propiononitrile, ethyl acetate, methyl propionate, ethyl propionate, dimethyl carbonate, tetraglyme, and the like. These non-aqueous solvents are typically used as multicomponent mixtures, into which a salt is dissolved to provide ionic conductivity. Exemplary salts to provide lithium conductivity include $LiClO_4$, $LiPF_6$, $LiBF_4$, LiTFSI, LiBETI, LiBOB, and the like.

The cathode 240 includes a cathode core 242 and a cathode composite bilayer coating 243 conformally disposed on at least a portion of the cathode core 242. For example, as shown in FIG. 2, the cathode composite bilayer coating 243 may be conformally disposed on a first surface 241 of the cathode core 242 opposite a second surface 242 of the cathode core 242 which is disposed on the positive current collector 210, as well as on exposed axial and lateral edges of the cathode core 242. The cathode core 242 may include one of a lithium-magnesium rich LLS (e.g., $LiMn_2O_4$ and variations thereof), a $LiCoO_2$, a $LiN_{1/3}Mn_{1/3}Co_{1/3}O_2$ (NMC) or a $Li[Li_{0.19}Mn_{0.57}Ni_{0.16}CO_{0.08}]O_2$, as well as high voltage spinels (e.g., $LiMn_{0.75}Ni_{0.25}O_4$ and variations thereof) or any other suitable cathode, as previously described herein.

The composite bilayer coating 243 protects the surface of the cathode core 242 from oxidation reaction and acidic species without any significant impact or degradation of an initial charge capacity of the cathode 240. In some embodiments, the cathode 240 having the composite bilayer coating 243 may retain greater than about 90% of its initial charge capacity after 100 charge/discharge cycles (e.g., greater than 50%, 60%, 70%, 80% or 90% of its initial charge capacity inclusive or all ranges and values therebetween). In various embodiments, the composite bilayer coating 243 includes a cathode first layer 244 disposed on at least the portion of the cathode core 242. The cathode first layer 244 includes at least one of a metal fluoride, a metal oxide or a metal sulfide. Furthermore, the composite bilayer coating 243 includes a cathode second layer 246 disposed on the cathode first layer 244. The cathode second layer 246 may also comprise at least one of metal fluoride, a metal oxide or a metal sulfide. For example, the cathode first layer 244 may include a metal fluoride and the cathode second layer 246 may include any one of a metal fluoride, a metal oxide or a metal sulfide. In other embodiments, the cathode first layer 244 may comprise a metal oxide and the cathode second layer 246 may include any one of a metal fluoride, a metal oxide or a metal sulfide. In still other embodiments, the cathode first layer 244 may comprise a metal sulfide and the cathode second layer 246 may include any one of a metal fluoride, a metal oxide or a metal sulfide.

In some embodiments, the metal fluoride comprises at least one of $Mg_xF_y$, $Al_xF_y$, $Li_xF_y$, $Al_xF_yW_z$ or $Al_xF_yW_zC_a$, where x, y, z and a are greater than 0. In some embodiments, the metal oxide comprises at least one of $Al_xO_y$, $Mg_xO_y$, or $Zr_xO_y$, where x and y are greater than 0. In other embodiments, the metal oxide comprises any one of $HfO_2$, $TiO_2$, $Y_2O_3$, or $ZrO_2$. In particular embodiments, the metal oxide may also be an oxide of the Lanthanide series or of the rare earth elements. In other embodiments, the metal oxide includes one or more Perovskites, including $CaTiO_3$, $BaTiO_3$, $SrTiO_3$, $PbTiO_3$, lead zirconate titanate (PZT), lead lanthanum zirconate titanate (PLZT), lead magnesium niobate (PMN), $KNbO_3$, $K_xNa_{1-x}NbO_3$, or $K(Ta_xNb_{1-x})O_3$. In other embodiments, the metal sulfide comprises at least one of $Li_xS_y$ or $Mo_xS_y$, where x and y are greater than 0. Some examples of the cathode composite bilayer coating 243 may include but are not limited to metal fluoride-metal fluoride composite bilayer coating (e.g., $MgF_2$-$AlF_3$, LiF—$MgF_2$, $AlF_3$—LiF, etc.), metal oxide-metal fluoride (e.g., $Al2O_3$—$MgF_2$, $MgO_2$—LiF, etc.), metal oxide-metal oxide (e.g., $Al_2O_3$—MgO, $ZrO_2$—MgO, etc.), metal sulfide-metal fluoride (e.g. LiS—LiF, $MoS_2$—$AlF_3$, LiS—$MgF_2$, etc.), and metal sulfide-metal oxide (e.g. $MoS_2$—$Al_2O_3$, LiS—MgO, $MoS_2$—MgO, etc.) or any other suitable combination of the cathode first layer 244 and the cathode second layer 246.

In various embodiments, the cathode composite bilayer coating 243 may have a thickness of less than 1 nm. Such a small thickness may allow the composite bilayer coating 243 to stabilize the cathode core 242 without having any significant impact on the impedance of the cathode 240. It should be noted that thicker (~10 nm) composite bilayer coatings (e.g., $Al_xW_yF_z$) on the cathode core 242 (e.g., a $LiCoO_2$ cathode core) may show discharge capacities of approximately 10 mAh/g, revealing a limitation in practical thicknesses. There is a trade-off between protection capability and facile diffusion of lithium ion. A 1 nm thick $Al_xW_y$Fz allows diffusion of lithium and protect underlying electrodes. In various embodiments, the thin cathode composite bilayer coating 243 may be deposited using an ALD process which may allow controlled deposition of thin conformal bilayer coating on the cathode core 242, as previously described with respect to FIG. 1.

In various embodiments, the anode 250 includes an anode core 252 and an anode composite bilayer coating 253 conformally disposed on the anode core 252. The anode core 252 may include graphite and or any other carbonaceous material such as, for example, carbon powder, pyrolytic carbon, carbon black, carbon fibers, carbon microfibers, carbon nanotubes (CNTs), single walled CNTs, multi walled CNTs, fullerene carbons including "bucky balls", graphene sheets and/or aggregate of graphene sheets, any other carbonaceous material or combination thereof. In some embodiments, the anode core 252 may include, for example, a lithium metal anode, or a calendared anode.

The anode composite bilayer coating 253 protects the surface of the anode core 252 from oxidation reaction and acidic species and may further stabilize the electrochemical cell 200, for example for operation at high voltages (≥approximately 4.4 V vs Li/Li+). In various embodiments, the anode composite bilayer coating 253 includes an anode first layer 254 disposed on at least the portion of the anode core 252. The anode first layer 254 includes at least one of a metal fluoride, a metal oxide or a metal sulfide (e.g., any of the metal fluoride, metal oxide or metal sulfide as described with respect to the cathode first layer 244). Furthermore, the anode composite bilayer coating 253 includes an anode second layer 256 disposed on the anode first layer 254. The anode second layer 256 may also comprise at least one of metal fluoride, a metal oxide or a metal sulfide (e.g., any of the metal fluoride, metal oxide or metal sulfide as described with respect to the cathode second layer 246). For example, the anode first layer 254 may include a metal fluoride and the anode second layer 256 may include any one of a metal fluoride, a metal oxide or a metal sulfide. In other embodiments, the anode first layer 254 may comprise a metal oxide and the anode second layer 256 may include any one of a metal fluoride, a metal oxide or a metal sulfide. In still other embodiments, the anode first layer 254 may comprise a metal sulfide and the anode second layer 256 may include any one of a metal fluoride, a metal oxide or a metal sulfide.

In various embodiments, the anode composite bilayer coating 253 may have a thickness of less than less than about 4 nm (e.g., less than about 4 nm, 3 nm, 2 nm or 1 nm inclusive of all ranges and values therebetween). In particular embodiment, the thickness of the composite bilayer coating may be less than about 1 nm. Such a small thickness may allow the anode composite bilayer coating 253 to stabilize the anode core 252 without having any significant impact on the impedance of the anode 250. In various embodiments, the thin anode composite bilayer coating 253 may also be deposited using an ALD process. In some embodiments, the anode composite bilayer coating 253 may be the same as the cathode composite bilayer coating 243 (e.g., have the same anode first layer 254 and anode second layer 256 as the cathode first layer 244 and the cathode second layer 246, respectively). In other embodiments, the anode composite bilayer coating 253 may be different from the cathode composite bilayer coating 243.

Providing the cathode 240 having the cathode composite bilayer coating 243 and, optionally the anode 250 having the anode composite bilayer coating stabilizes the cathode 240 and the anode 250, and protects the cathode 240 and the anode 250 from acidic species or oxidation reactions at the cathode 240 and electrolyte interface or anode 250 and electrolyte interface, particularly at high voltage operation (e.g., ≥approximataely 4.4 V vs Li/Li+). In this manner, the composite bilayer coatings 243, 253 may prolong the life of the cathode 240 and the anode 250, respectively and allow the electrochemical cell 200 retain its initial charge/discharge capacity for a much larger number of charge/discharge cycles relative to a similar electrochemical cell that does not include the composite bilayer coatings on a cathode and/or anode thereof.

Figure 3:
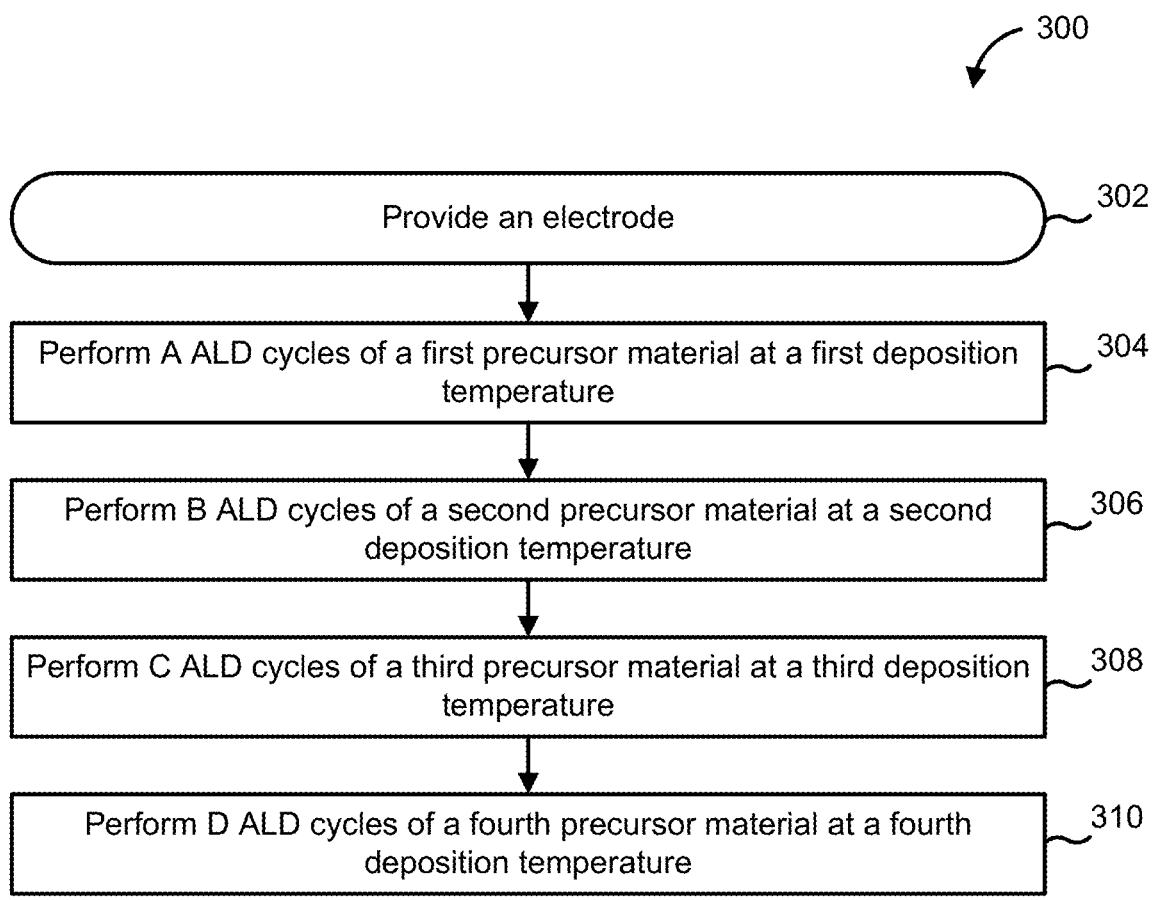
FIG. 3 is a schematic flow diagram of a method for forming an electrode including a composite bilayer coating disposed on an electrode core of the electrode, according to an embodiment.

FIG. 3 is a schematic flow diagram of a method 300 for forming a composite bilayer coating on an electrode core (e.g., the electrode core 102) according to an embodiment. The method 300 includes providing an electrode including an electrode core, at 302. For example, the electrode may include a cathode (e.g., the cathode 240 including the cathode core 242) or an anode (e.g., the anode 250 include the anode core 252), as previously described in detail herein.

At 304, A ALD cycles of a first precursor material which includes a metal precursor are performed at a first deposition temperature on the electrode. At 306, B ALD cycles of a second precursor material including one of a fluoride, an oxide or a sulfide precursor is performed at a second deposition temperature on the electrode. In various embodiments, the second precursor material is formulated to react with the first precursor material to form (e.g., grow or deposit) a first layer (e.g., the first layer 104) of a conformal bilayer coating (e.g., the conformal bilayer coating 103) on at least a portion of an electrode core (e.g., the electrode core 102) of the electrode (e.g., the electrode 100).

For example, the first precursor material comprising the metal precursor may include TMA, triisobutylaluminum, aluminum tris(2,2,6,6-tetramethyl-3,5-heptanedionate), tris (dimethylamido)aluminum(III), diethyl zinc, diphenyl zinc, bis(pentafluorophenyl)zinc, bis(2,2,6,6-tetramethyl-3,5-heptanedionato)zinc(II), tetramethyl tin, molybdenumhexacarbonyl, bis(cyclopentadienyl)magnesium(II), bis(cyclopentadienyl)zirconium(IV) dihydride 95%, zirconium(IV) dibutoxide(bis-2,4-pentanedionate), zirconium(IV) 2-ethylhexanoate or any other suitable metal precursor.

In some embodiments, the second precursor material may comprise a fluoride precursor, for example, tungsten hexafluoride ($WF_6$), disilane ($Si_2H_6$) or sulfur hexafluoride ($SF_6$). In such embodiments, the first layer may include a metal fluoride including at least one of $Mg_xF_y$, $Al_xF_y$, $Li_xF_y$, $Al_xF_yW_z$ or $Al_xF_yW_zC_a$, where x, y, z and a are greater than 0, or any other metal fluoride described herein. In other embodiments, the second precursor material may include an oxide precursor, for example, water. In such embodiments, the first layer may include a metal oxide including at least one of $Al_xO_y$, $Mg_xO_y$, or $Zr_xO_y$, where x and y are greater than 0, or any other metal oxide described herein. In still other embodiments, the second precursor material may include a sulfide precursor, for example, $H_2S$. In such embodiments, the first layer may include a metal sulfide including at least one of $Li_xS_y$ or $Mo_xS_y$, where x and y are greater than 0, or any other metal oxide described herein.

In various embodiments, alternate exposures of the first precursor material and the second precursor material may be performed on the electrode (e.g., the electrode 100) so as to grow the first layer with high control. In some embodiment, A cycles of the first precursor material may be equal to the B cycles of the second precursor material (e.g., 1, 2, 3, 4, 5, 6, 7, 8, 9, 10 cycles or any other suitable number of cycles). In various embodiments, alternative exposures of the first and second precursor material may cause the first layer to grow at a rate of less than 3 angstrom per cycle. Furthermore, each of the first deposition temperature and the second deposition temperature may in a range of 50-200 degrees Celsius (e.g., 50, 60, 70, 80, 100, 120, 140, 160, 180 or 200 degrees Celsius inclusive of all ranges and values therebetween). Such a low deposition temperature may be relatively harmless to the active materials, conductive materials and polymeric binder included in the electrode (e.g., a cathode or an anode). In various embodiments, the first layer deposited using ALD may be highly conductive (e.g., having a resistivity of less than $3.5 \times 10^{-2}$ ohm.cm) and may be amorphous.

At 308, C ALD cycles of a third precursor material comprising a metal precursor is performed at a third deposition temperature on the electrode. At 310, D ALD cycles of a fourth precursor material comprising one of a fluoride, an oxide or a sulfide precursor is performed at a fourth deposition temperature on the electrode. In various embodiments, the fourth precursor material is formulated to react with the third precursor material to form (e.g., grow or deposit) a second layer (e.g., the second layer 106) of the conformal bilayer coating (e.g., the conformal bilayer coating 103) on the first layer (e.g., the first layer 104) of the electrode (e.g., the electrode 100).

The third precursor material may include any of the metal precursors described with respect to the first precursor material. Furthermore, the fourth precursor material may include any of the fluoride precursor, oxide precursor or sulfide precursor described with respect to the second precursor material. In various embodiments, alternate exposures of the third precursor material and the fourth precursor material may be performed on the electrode (e.g., the electrode 100) so as to grow the second layer with high control on the first layer. In some embodiment, C cycles of the third precursor material may be equal to D cycles of the fourth precursor material (e.g., 1, 2, 3, 4, 5, 6, 7, 8, 9, 10 cycles or any other suitable cycles). In various embodiments, alternative exposure of the first and second precursor material may cause the second layer to grow at a rate of less than 3 angstrom per cycle. Furthermore, each of the third deposition temperature and the fourth deposition temperature may be in a range of 50-200 degrees Celsius (e.g., 50, 60, 70, 80, 100, 120, 140, 160, 180 or 200 degrees Celsius inclusive of all ranges and values therebetween), for example, the same as the first deposition temperature and/or the second deposition temperature.

In some embodiments, the second layer may be the same as the first layer of the conformal bilayer coating. In other embodiments, the second layer may be different from the first layer of the conformal bilayer coating. In various embodiments, the composite bilayer coating may include but are not limited to a metal fluoride-metal fluoride composite bilayer coating (e.g., $MgF_2$-$AlF_3$, LiF—$MgF_2$, $AlF_3$—LiF, etc.), a metal oxide-metal fluoride coating (e.g., $Al2O_3$—$MgF_2$, $MgO_2$—LiF, etc.), a metal oxide-metal oxide coating (e.g., $Al_2O_3$—MgO, $ZrO_2$—MgO, etc.), a metal sulfide-metal fluoride coating (e.g. LiS—LiF, $MoS_2$—$AlF_3$, LiS—$MgF_2$, etc.), a metal sulfide-metal oxide coating (e.g. $MoS_2$—$Al_2O_3$, LiS—MgO, $MoS_2$—MgO, etc.) or any other suitable combination of the first layer and the cathode second layer.

In various embodiments, other post-processing operations may be performed, for example, to improve a texture of the conformal bilayer coating, improve adhesion to the electrode core, and/or improve electrical properties (e.g., allow coating materials to mix with cation materials). Such post-processing operations may include, but are not limited to annealing temperature (e.g., annealing at a temperature below 200 degrees Celsius), annealing time, precursor material pressure, or any other post-processing operation as are commonly known in the arts.

The following section describes examples of electrochemical cells including a baseline electrochemical cell including uncoated electrodes, a first electrochemical cell including a cathode coated with a conformal bilayer coating, and a second electrochemical cell including the cathode coated with the conformal bilayer coating and the anode coated with a conformal monolayer coating. These examples are only for illustrative purposes and are not meant to limit the scope of the concepts described herein.

Experimental Examples

Figure 4:
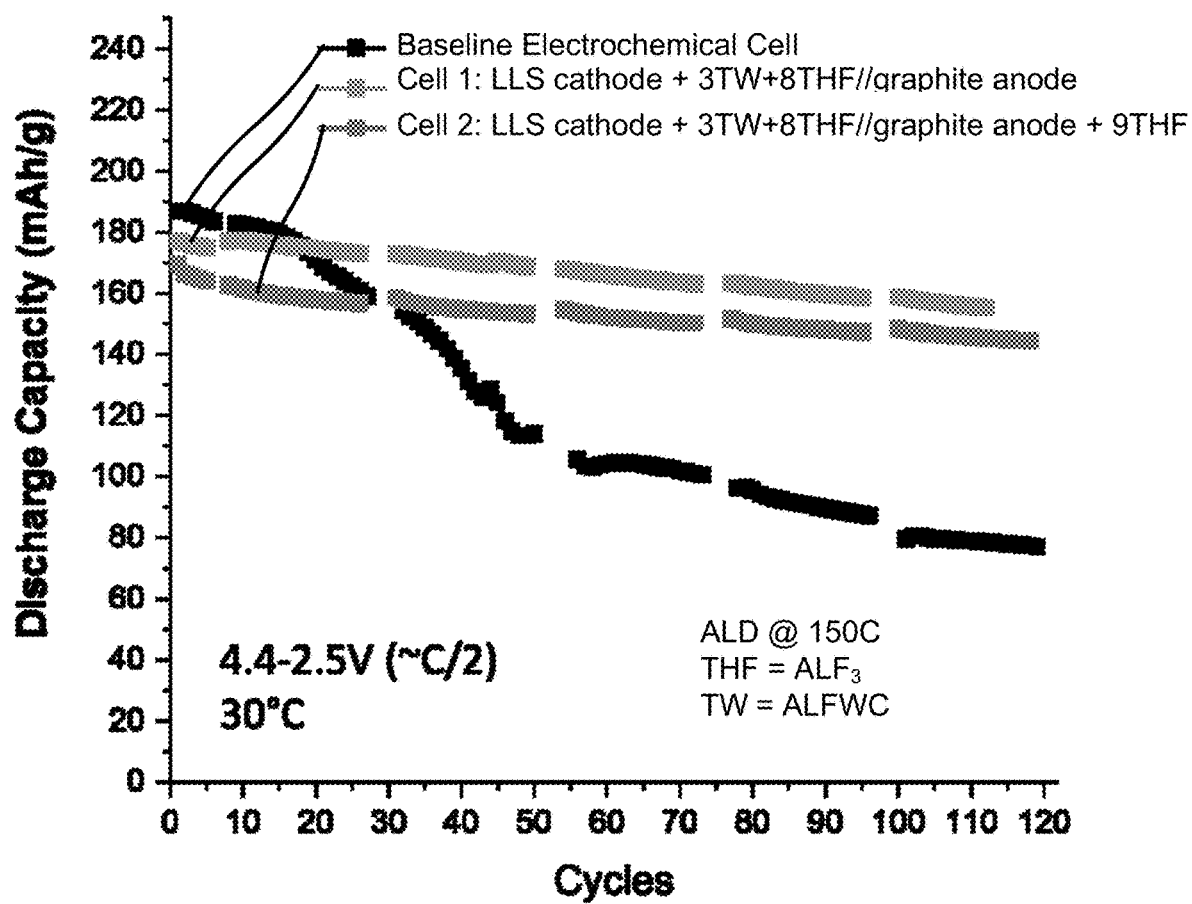
FIG. 4 are plots of discharge capacity of a baseline electrochemical cell, a first electrochemical cell that includes a cathode having a composite bilayer coating disposed on a cathode core thereof, an a second electrochemical cell that includes a cathode having a conformal bilayer coating and an anode having a conformal monolayer coating.

FIG. 4 shows plots of discharge capacity of a baseline electrochemical cell, a first electrochemical cell (Cell 1) including a cathode coated with a conformal bilayer coating, and a second electrochemical cell (Cell 2) including a cathode coated with a conformal bilayer coating and an anode coated with a conformal monolayer coating. A total of 120 charge/discharge cycles were performed for each electrochemical cell at a discharge rate of C/2 and a temperature of 30 degrees Celsius at a voltage of 4.5-2.5 V.

The baseline electrochemical cell includes a LLS cathode and a graphite anode, which do not include a conformal bilayer coating disposed thereon. The baseline electrochemical cell has the highest initial discharge capacity of approximately 190 mAh/g. The discharge capacity of the baseline electrochemical cell sharply degrades after 20 charge/discharge cycles and reduces to a discharge capacity of approximately 80 mAh/g after 120 cycles.

Cell 1 includes a LLS cathode coated with a conformal bilayer coating including a first layer comprising $Al_xF_yW_zC_a$ disposed on a cathode core, and a second layer comprising $Al_xF_y$ disposed on the first layer where x, y, z and a are greater than 0. The anode is graphite which is uncoated. The first layer is disposed on the cathode core via 3 alternate ALD cycles of TMA and $WF_6$, and the second layer is disposed on the first layer via 8 alternate ALD cycles of TMA and $SF_6$. The deposition temperature used in each of the ALD cycles is 150 degrees Celsius. As observed from FIG. 4, Cell 1 had an initial discharge capacity of approximately 170 mAh/g, which is smaller than the initial discharge capacity of the baseline electrochemical cell. However, the discharge capacity of Cell 1 decreases significantly less than the baseline electrochemical cell such that after 120 charge/discharge cycles, the discharge capacity of Cell 1 is approximately 150 mAh/g decreasing linearly at a rate of approximately 0.166 mAh/g per cycle.

Cell 2 includes a LLS cathode which is the same as the LLS cathode of Cell 1 and is coated with a conformal bilayer coating including a first layer comprising $Al_xF_yW_zC_a$ disposed on a cathode core, and a second layer comprising $Al_xF_y$ disposed on the first layer where x, y, z and a are greater than 0 using the same ALD process as described with the cathode of Cell 1. The anode is graphite which is the same as the anode of the baseline electrochemical cell and Cell 1, but is coated with a conformal monolayer coating of $Al_xF_y$ where x, y, z and a are greater than 0. The conformal monolayer coating is disposed on the anode via 9 alternate ALD cycles of TMA and $WF_6$. The deposition temperature used in each of the ALD cycles is 150 degrees Celsius. Furthermore, each of the conformal bilayer coating disposed on the cathode and the conformal monolayer coating disposed on the anode have a thickness of less than 1 nm. As observed from FIG. 4, Cell 2 had an initial discharge capacity of approximately 180 mAh/g, which is smaller than the initial discharge capacity of the baseline electrochemical cell but higher than the initial discharge capacity of Cell 1. However, the discharge capacity of Cell 2 decreases significantly less than the baseline electrochemical cell such that after 120 charge/discharge cycles, the discharge capacity of Cell 2 is approximately 160 mAh/g decreasing linearly at a rate of approximately 0.166 mAh/g per cycle, similar to Cell 1.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An electrode, comprising:
an electrode core; and
a composite bilayer coating conformally disposed on at least a portion of the electrode core, the composite bilayer coating comprising:
a first metal fluoride layer disposed on at least the portion of the electrode core, the first metal fluoride layer comprising $Al_xF_yW_zC_a$, where x, y, z and a are greater than 0, and
a second metal fluoride layer disposed on the first metal fluoride layer, the second metal fluoride layer comprising $Mg_xF_y$, $Al_xF_y$, or $Li_xF_y$, where x, y are greater than 0.

2. The electrode of claim 1, wherein the electrode comprises a cathode, and wherein the electrode core comprises one of a lithium-magnesium rich layered-layered, or layered-layered-spinel, a $LiCoO_2$, a LiMnNiCoO$_2$ (NMC, e.g., $LiN_{1/3}Mn_{1/3}Co_{1/3}O_2$, $LiNi_{0.8}Mn_{0.1}Ni_{0.1}O_2$) or a $Li[Li_{0.19}Mn_{0.57}Ni_{0.16}Co_{0.08}]O_2$.

3. The electrode of claim 1, wherein the electrode comprises an anode, and wherein the electrode core comprises graphite.

4. The electrode of claim 1, wherein the composite bilayer coating has a thickness of less than 1 nm.

5. An electrochemical cell, comprising:
a cathode comprising:
a cathode core comprising one of a lithium-magnesium rich layered-layered spinel, a $LiCoO_2$, a $LiN_{1/3}Mn_{1/3}Co_{1/3}O_2$ or a $Li[Li_{0.19}Mn_{0.57}Ni_{0.16}Co_{0.08}]O_2$; and
a cathode composite bilayer coating conformally disposed on at least a portion of the cathode core, the cathode composite bilayer coating comprising:
a cathode first layer disposed on at least the portion of the cathode core, the cathode first layer comprising a first metal fluoride comprising $Al_xF_yW_zC_a$, where x, y, z and a are greater than 0, and
a cathode second layer disposed on the cathode first layer, the cathode second layer comprising a second metal fluoride comprising $Mg_xF_y$, $Al_xF_y$, or $Li_xF_y$, where x, y are greater than 0;
an anode; and
a separator disposed between the cathode and the anode.

6. The electrochemical cell of claim 5, wherein the anode comprises:
an anode core, and
an anode composite bilayer coating conformally disposed on at least a portion of the anode core, the anode composite bilayer coating comprising:
an anode first layer disposed on at least the portion of the anode core, the anode first layer comprising a third metal fluoride or a third metal sulfide, and
an anode second layer disposed on the anode first layer, the anode second layer comprising a fourth metal fluoride or a fourth metal sulfide.

7. The electrochemical cell of claim 6, wherein the anode core comprises graphite.

8. The electrode of claim 5, wherein the cathode composite bilayer coating has a thickness of less than 1 nm.

9. A method, comprising:
providing an electrode comprising an electrode core;
performing A atomic layer deposition cycles of a first precursor material comprising a metal precursor at a first deposition temperature on the electrode;
performing B atomic layer deposition cycles of a second precursor material comprising a first fluoride precursor at a second deposition temperature on the electrode;
performing C atomic layer deposition cycles of a third precursor material comprising a metal precursor at a third deposition temperature on the electrode; and
performing D atomic layer deposition cycles of a fourth precursor material comprising a second fluoride precursor at a fourth deposition temperature on the electrode,
wherein the respective atomic layer deposition cycles form a conformal bilayer coating on at least a portion of the electrode core, the composite bilayer coating comprising:
a first metal fluoride layer disposed on at least the portion of the electrode core, the first metal fluoride layer comprising $Al_xF_yW_zC_a$, where x, y, z and a are greater than 0, and
a second metal fluoride layer disposed on the first metal fluoride layer, the second metal fluoride layer comprising $Mg_xF_y$, $Al_xF_y$, or $Li_xF_y$, where x, y are greater than 0;
applying a secondary treatment, mixing at least a portion of the first layer and a portion of the second layer.

10. The method of claim 9, wherein the second precursor material is formulated to react with the first precursor material to form the first layer, and wherein the fourth precursor material is formulated to react with the third precursor material to form the second layer.

11. The method of claim 9, wherein each of the first deposition temperature, the second deposition temperature, the third deposition temperature and the fourth temperature is in a range of 50-200 degrees Celsius.

* * * * *